P. WELLIVER.
AUTOMOBILE THEFT PREVENTING DEVICE.
APPLICATION FILED SEPT. 14, 1920.
1,380,617.
Patented June 7, 1921.
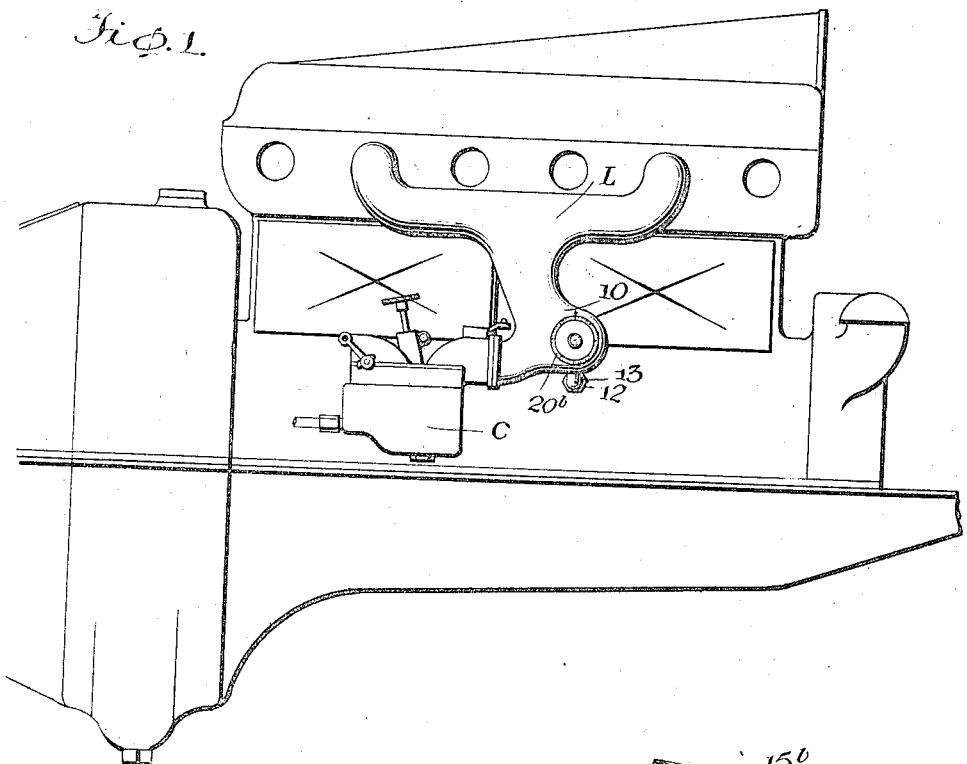
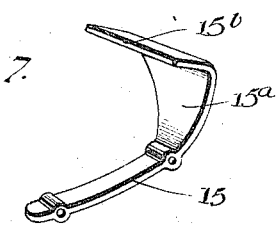
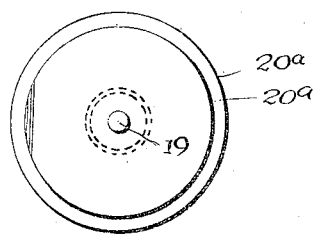
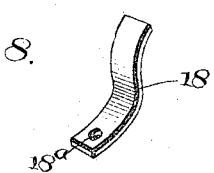
WITNESSES
INVENTOR
P. Welliver,
BY
ATTORNEYS P. WELLIVER.
AUTOMOBILE THEFT PREVENTING DEVICE.
APPLICATION FILED SEPT. 14, 1920.
1,380,617.
Patented June 7, 1921.
2 SHEETS—SHEET 2.
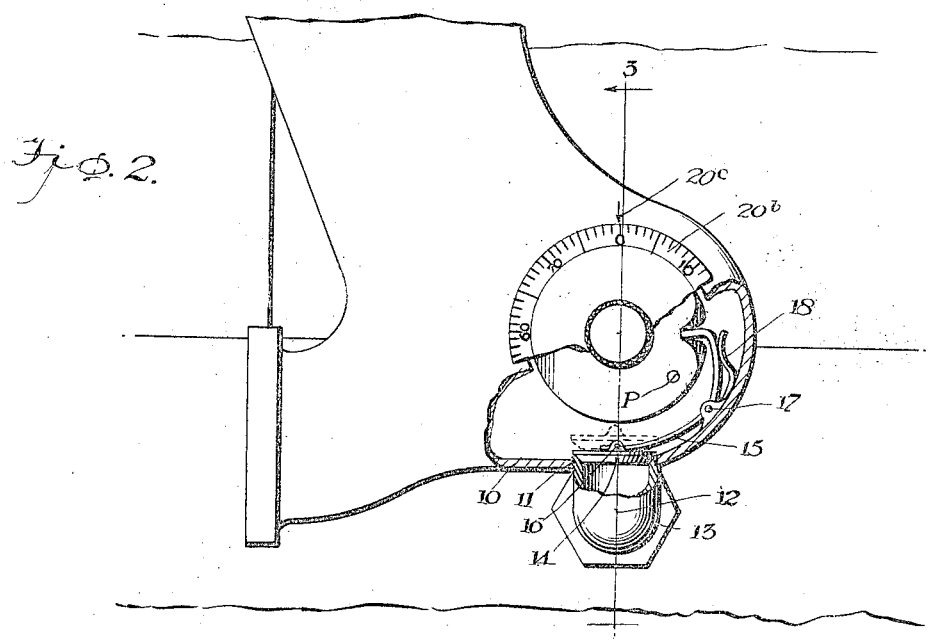
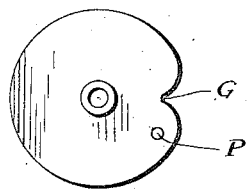
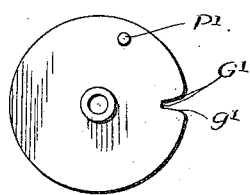
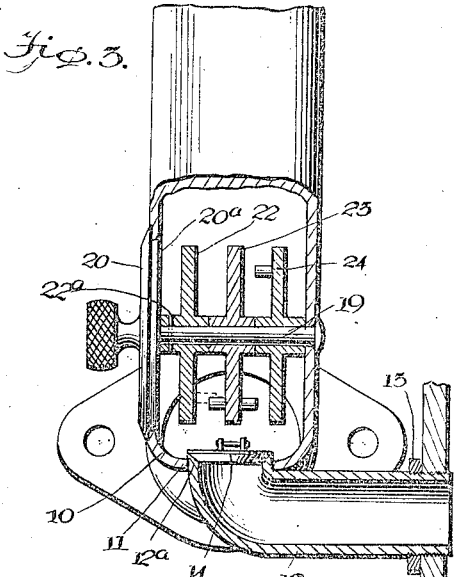
WITNESSES
R. E. Rousseau
W. F. Brickley
INVENTOR
P. Welliver,
BY Munn & Co.
ATTORNEYS

UNITED STATES PATENT OFFICE.

PERCY WELLIVER, OF HEREFORD, TEXAS.

AUTOMOBILE-THEFT-PREVENTING DEVICE.

1,380,617.    Specification of Letters Patent.    Patented June 7, 1921.

Application filed September 14, 1920. Serial No. 410,246.

*To all whom it may concern:*

Be it known that I, PERCY WELLIVER, a citizen of the United States, and a resident of Hereford, in the county of Deaf Smith, and State of Texas, have invented certain new and useful Improvements in Automobile-Theft-Preventing Devices, of which the following is a specification.

The present invention relates to automobile theft preventing devices.

The object of the invention is to provide a device of this character which will be effective to prevent the operation of an automobile by an unauthorized person and so to prevent the theft thereof, which may be manipulated by an authorized person to permit the operation of the automobile and which is simple and durable in construction, reliable in operation and easy and inexpensive to manufacture.

Other objects and advantages of the invention reside in certain novel features of construction, combination and arrangement of parts as will be hereinafter more fully described and particularly pointed out in the appended claims, reference being had to the accompanying drawings forming part of this specification, and in which:

Figure 1 is an elevational view of an engine of an automobile equipped with the invention;

Fig. 2 is a fragmentary side elevational view, parts being broken away and shown in section for the sake of illustration;

Fig. 3 is a transverse vertical sectional view on line 3—3 of Fig. 2, parts being shown in elevation for the sake of illustration;

Fig. 4 is a detail view in side elevation of the fixed tumbler;

Fig. 5 is a similar view of one of the loose tumblers;

Fig. 6 is a detail view in rear elevation of the dial;

Fig. 7 is a detail perspective view of the rocking lever; and

Fig. 8 is a detail perspective view of the valve lever spring.

Referring to the drawings it will be seen that the invention contemplates an automobile engine of any standard or conventional construction which includes an intake manifold L adapted to convey the fuel to the cylinders of the engine from the carbureter C. The intake manifold is provided with an integral enlargement 10 between the carbureter and the openings of the manifold to the cylinders. The enlargement 10 has in its lower wall a threaded opening 11, as shown in Figs. 2 and 3. A pipe 12 has one end threadedly connected with the opening 11 and the other end threaded into the crank casing of the automobile engine. A lock nut 13 secures the pipe to the crank casing. The pipe 12 constitutes a bypass to the atmosphere as the interior of the crank casing is in communication with the atmosphere. It is larger and nearer to the cylinders of the engine than the opening through the mixing chamber of the carbureter and consequently it will permit a free flow of air to the cylinders of the engine so that the pumping effect of the pistons as far as it concerns the carbureter is reduced to practically nothing and there will not be induced any flow of fuel from the carbureter to the engine cylinders but only a supply of air through the bypass 12. The engine being without fuel will not operate and cannot be operated, and by connecting the bypass to the crank case of the engine it is rendered inaccessible and cannot be plugged up.

Valve means is provided for controlling the bypass 12 and preferably consists of a disk valve 14 which is adapted to coöperate with the seat 12$^a$ formed at the intake manifold end of the bypass 12. A rocking lever 15 for operating the valve has one end pivotally connected thereto, as at 16, and is fulcrumed intermediate its ends to the interior of the enlargement of the manifold, as at 17. At its upper end beyond the fulcrum 17, the lever is laterally enlarged, as designated at 15$^a$, and at its upper end it is provided with an inturned extension or shoulder 15$^b$. A blade spring 18, has one end provided with an aperture 18$^a$ by which it is adapted to be fixed to the interior of the manifold enlargement and bears at its other end against the portion 15$^a$ of the rocking lever. The blade spring throws the lever to position to close the disk valve 14, as shown in full lines in Fig. 2.

Locking means is provided for maintaining the valve 14 opened or closed as desired. The locking means is preferably of the permutation type and includes a rotatable spindle 19 suitably journaled in the enlargement 10 of the intake manifold. The outer end of the spindle carries a dial 20 having an integral and inwardly extending reduced flange 20$^a$ which is seated in the opening provided therefor in the intake manifold enlargement. An operating knob 21 is integrally formed with the center of the dial. Both the knob and the dial are fixed to the spindle 19 so as to be constrained to partake of all motion therewith. The exposed face of the dial is provided with suitable indicia 20$^b$ which is adapted to coöperate with an arrow 20$^c$ provided on the hollow wall of the intake manifold in the usual manner. Within the intake manifold enlargement a fixed tumbler 22 is secured as by a pin 22$^a$ to the spindle 19. The fixed tumbler 22 is arranged adjacent the dial 20 and being fixed along with the dial to the spindle 19 is constrained to partake of the same motion as the dial. Loose tumblers 23 and 24, respectively, are also arranged upon the spindle 19 within the intake manifold enlargement. The fixed tumbler 22 is constructed as more especially shown in Fig. 4 and is provided with a gate G in its periphery, the walls of which are beveled or inclined, as at $g$ for a purpose to hereinafter more fully appear. The fixed tumbler is also provided with a pin P which extends parallel to the spindle 19, upon which the fixed tumbler is mounted. The loose tumblers 23 and 24 are of identical construction, and as more especially shown in Fig. 5 each comprises a disk having a gate G$^1$ in its periphery, the walls of which are substantially vertical or nearly so, as shown at G$^2$. The disk is also provided with a pin $p^1$ which is adapted to extend parallel to the spindle 19.

The right angular extension 15$^b$ of the rocking lever 15 is adapted to bear against the periphery of the tumblers and when so disposed maintains the valve 14 open or in the position shown in dotted lines in Fig. 2, and thus prevents operation of the engine. Again the extension 15$^b$ when the tumblers are properly adjusted may be disposed in the gates G and G' of the tumblers and in this position the valve 14 is closed and the engine may operate.

In operation the valve controlling the bypass is opened or closed by adjustment of the dial and consequent adjustment of the tumblers. To effect this adjustment the operator grasps the operating knob 21 and rotates the same according to the combination. The rotation of the knob rotates the dial and the fixed tumbler 22. The pin P of the fixed tumbler eventually strikes against the pin P$^1$ of the adjacent loose tumbler 23 and the pin P$^1$ of the tumbler 23 coacts with the pin P$^1$ of the tumbler 24. In this manner the tumblers may be positioned so that the gates thereof are alined and are disposed so as to permit entering thereinto of the extension 15$^b$ of the rocking lever and thus permit closing of the valve cutoff bypass to allow the engine to operate. After the valve has been closed it may be opened by simply turning the knob 21 as when this is turned the fixed tumbler rotates and the inclined walls $g$ of the gate force the locking lever outwardly to the periphery of the tumblers. The knob is then swung back and forth to throw the tumblers so that their gates are disposed at various positions and out of the path of the rocking lever. When desired the valve may be easily closed and maintained closed by an authorized person acquainted with the combination but when the valve is opened the device is effective to prevent operation of the engine and consequently to prevent theft.

I claim:

1. In a device of the character described, in combination with an engine of an automobile including an intake manifold, a carbureter, and a crank case, a bypass from the manifold to the crank case, a disk valve for controlling the flow of air through the bypass, a rocking lever having one end pivotally connected to the disk vlave and having a right angular extension at its opposite end, a spring engaging said lever to maintain said valve closed, locking means for maintaining said valve in desired position, including a spindle, a dial fixed to said spindle, a tumbler fixed to said spindle having a gate in its periphery provided with inclined walls, a plurality of loose tumblers mounted upon said spindle and each having a gate in its periphery, said tumblers and said rocking valve lever being disposed so that the right angular extension of the lever normally bears against the peripheries of said tumblers and is adapted to enter the gates thereof when said tumblers are alined.

2. In a device of the character described, in combination with an engine of an automobile including an intake manifold, carbureter, and a crank case, a bypass from the manifold to the crank case, a disk valve for controlling the flow of air through the bypass, a rocking lever having one end pivotally connected to the disk valve and having a right angular extension at its opposite end, a spring engaging said lever to maintain said valve closed, and locking means for maintaining said valve in desired position.

3. In a device of the character described, in combination with an engine of an automobile, including an intake manifold, a carbureter and a crank case, a bypass leading from said intake manifold to said crank case, a valve for said bypass, a rocking lever controlling said valve and locking means coacting with said rock lever for maintaining said valve in opened or closed position.

4. In an automobile theft preventing device of the character described, in combination with an engine of an automobile including a carbureter, an intake manifold and a crank case, a bypass leading from the intake manifold, intermediate the carbureter and the engine to the crank case.

5. In a device of the character described, in combination with the engine of an automobile, including an intake manifold, a carbureter and a crank case, a bypass from the manifold to the crank case, a disk valve for controlling the flow of air through the bypass, a rocking lever having one end pivotally connected to the disk valve and having a right angular extension at its opposite end, a spring engaging said lever to maintain said valve closed, locking means for maintaining said valve in desired position including a rotatable spindle, a dial fixed to said spindle, a tumbler fixed to said spindle having a gate in its periphery provided with inclined walls and having a laterally extending pin, a plurality of loose tumblers mounted upon said spindle and each having a gate in its periphery provided with substantially vertical walls, said tumblers being further provided with lateral pins adapted to coact with each other and with the pin of the fixed tumbler, said tumbler and said rocking lever being disposed so that the right angular extension of the lever normally bears against the peripheries of said tumblers and is adapted to enter the gates thereof.

6. In a device of the character described, in combination with the engine of an automobile, including an intake manifold, a carbureter and a crank case, a bypass from the manifold to the crank case, a disk valve for controlling the flow of the air through the bypass and means for maintaining said disk valve in desired position including a rotatable spindle, a dial fixed to said spindle, a tumbler fixed to said spindle, and a plurality of loose tumblers mounted upon said tumblers, all as and for the purposes set forth.

PERCY WELLIVER.